United States Patent [19]

Reimann

[11] Patent Number: 4,650,006
[45] Date of Patent: Mar. 17, 1987

[54] AUXILIARY MOUNTING DEVICE FOR CULTIVATING IMPLEMENTS

[76] Inventor: Harold J. Reimann, 537 S. Segoe Rd., Madison, Wis. 53711

[21] Appl. No.: 513,239

[22] Filed: Jul. 13, 1983

[51] Int. Cl.$^4$ .................. A01B 15/14; A01B 49/02
[52] U.S. Cl. .................. 172/443; 172/178; 172/140
[58] Field of Search .................. 172/443, 47, 196, 198, 172/178, 145, 146, 147, 148, 149, 679, 680, 595, 587, 413, 699, 676, 677, 45, 63, 70, 327, 328

[56] References Cited

U.S. PATENT DOCUMENTS

| | | | |
|---|---|---|---|
| 3,757,871 | 9/1973 | Maust | 172/178 |
| 3,931,858 | 1/1976 | North | 172/443 |
| 3,937,460 | 2/1976 | Lely | 172/70 |
| 3,983,943 | 10/1976 | Lely | 172/70 |
| 4,057,111 | 11/1977 | Lely | 172/72 |
| 4,088,083 | 5/1978 | Dail | 172/63 |
| 4,324,295 | 4/1982 | Weichel | 172/28 |
| 4,406,329 | 9/1983 | Schlueter | 172/443 |

FOREIGN PATENT DOCUMENTS

| | | | |
|---|---|---|---|
| 613303 | 12/1960 | Italy | 172/178 |
| 2019703 | 11/1979 | United Kingdom | 172/328 |

OTHER PUBLICATIONS

M & W Till'N' Tote Assembly Instructions Adjusting Instructions and Parts List, Publication 3895 & 3881 of M & W Gear Co., Gibson City, Il., 10-1981.

*Primary Examiner*—Richard J. Johnson
*Attorney, Agent, or Firm*—Isaksen, Lathrop, Esch, Hart & Clark

[57] ABSTRACT

An auxiliary mounting device for use with a tractor having a one-point tractor hitch. The auxiliary mounting device includes a body having a forward end and a rearward end with the longitudinal axis of the body extending therebetween. Means are provided for attaching the body to the tractor hitch. The auxiliary mounting device includes a primary tool mount on which a primary cultivating tool may be mounted in fixed relation to the body. A secondary tool mount is located rearwardly of the primary tool mount. A secondary cultivating tool may be mounting thereon. Wheels are attached to the body in rotating relation and are located at a selected point between the primary and secondary tool mounts. Means are provided for moving the wheels between a first position, wherein the wheels support and elevate the body and the primary and secondary cultivating tools are held above the ground, and a second position, wherein the body is lowered and the primary and secondary cultivating tools are engaged with the ground.

5 Claims, 4 Drawing Figures

4,650,006

AUXILIARY MOUNTING DEVICE FOR CULTIVATING IMPLEMENTS

TECHNICAL FIELD

The present invention relates to devices for mounting agricultural cultivating implements on tractors and other sources of motive power and, in particular, to such devices adapted to mount more than one such implement on such a tractor.

BACKGROUND OF ART

Conventional tractors used in agricultural operations are adapted to pull various ground cultivating implements over the field to be cultivated. Typically, tractors have two means of attaching such implements to the tractor. Most tractors have a simple drawbar which is normally centrally located at the rear of the tractor and which functions in the manner of a simple trailer hitch. In addition, most tractors also have a three-point hitch, also mounted at the rear of the tractor. A three-point hitch typically includes two points of attachment located on lifting arms spaced on either side of the center line of the tractor. Implements attach to them in pinned relation, so that the implements may be raised or lowered relative to the tractor by raising or lowering the lifting arms driven by the tractor hydraulic system. A third point of attachment is located above the other points of attachment, and midway between them. The third point of attachment comprises a link which is pinned to the tractor at one end and to the implement at the other end to complete a stable, "three-point" connection between the tractor and implement. Thus, by hydraulically lifting the lifting arms, the cultivating implement and implement end of the center link are lifted to position the implement or raise it off the ground for turning or transporting. Conversely, lowering of the lifting arm positions the implement for tillage or other purposes.

An advantage of the three-point hitch system is that the weight of the implement may be transferred to the rear wheels of the tractor to increase traction during use of the implement. A disadvantage of the three-point hitch system is that the implement, when elevated, exerts a downward torque effect on the rear of tractor which tends to lift the front end of the tractor, with the tractor rotating about its back wheels. This effect is increased with the weight of the implement and its distance from the rear wheels. As a consequence, a three-point hitch system on a particular tractor is subject to certain limits of implement weight and rearward extension.

It has become increasingly economical to cultivate large fields in such a way as to require the fewest possible trips with the tractor over the field. Thus, instead of covering the field first with a primary cultivating implement, such as an array of disks, and then with a finishing implement, such as a rotary harrow, it is advantageous to be able to mount the two implements one behind the other. Conventionally this is done by combining them into a single, compound machine. Examples include the cultivating implements shown in van der Lely, U.S. Pat. Nos. 3,937,460; van der Lely, 3,983,943; van der Lely, et al., 4,057,111; Dail, Jr., et al., 4,088,083; and Weichel, 4,324,295. Each of the implements shown in the patents referred to is adapted to be attached to a three-point hitch. The implements are lifted as a unit by means of the three-point hitch when it is desired to disengage them from the ground. As a consequence, when in the raised position, a great deal of torque is applied to the tractor, effectively limiting the size of the compound implement that may be achieved.

Another characteristic of a three-point hitch mounted implement is that the connected rigid implement remains generally aligned with the center line of the tractor during use. As a consequence, a cultivating implement so mounted is moved transversely through the soil if it is not lifted from the ground when the tractor turns. This effect is increasingly important as the implement is made either wider or longer. Consequently, when it is desirable to leave a wide or long implement in contact with the ground during turns, or when an implement is so heavy that to raise it with a three-point hitch threatens the stability of the tractor, it is conventional to attach the implement to the tractor by the tractor's drawbar. By this means, the implement can freely trail the center line of a tractor in a turn, following the tractor has would any trailer.

Not using the three-point hitch requires some alternative means of lifting the cultivating parts of the implement above the ground. Conventionally, wheels are provided for the implement, which wheels may be moved from a raised position, in which the ground cultivating parts of the implement are in contact with the ground, to a lowered position, in which the wheels bear the weight of the implement and hold its cultivating parts above the ground. An example is the pull-type rotary harrow sold by the Lely Corporation under the trademark Lely-Roterra ® RH 900-60. More than one such cultivating implement can be attached as a train drawn by a single tractor to be controlled independently of each other, each with its own means for raising and lowering the cultivating parts of the implement. The result is a complicated and cumbersome arrangement.

SUMMARY OF THE INVENTION

The present invention is summarized in that an auxiliary mounting device for use with a tractor having a one-point tractor hitch includes a body having a forward end and a rearward end with the longitudinal axis of the body extending therebetween. Means are provided for attaching the body to the tractor hitch. The auxiliary mounting device includes a primary tool mount on which a primary cultivating tool may be mounted in fixed relation to the body. A secondary tool mount is located rearwardly of the primary tool mount. A secondary cultivating tool may be mounted thereon. Wheels are attached to the body in rotating relation and are located at a selected point between the primary and secondary tool mounts. Means are provided for moving the wheels between a first position, wherein the wheels support and elevate the body and the primary and secondary cultivating tools are held above the ground, and a second position, wherein the body is lowered and the primary and secondary cultivating tools are engaged with the ground.

A primary object of the invention is to provide an auxiliary mounting device adapted to be attached to a tractor or comparable source of motive power by means of a one-point drawbar hitch, the mounting device being provided with means to mount at least two cultivating tools thereon.

A second object of the invention is to provide such a mounting device adapted to lower and raise the two cultivating tools so as to engage and disengage them from the ground.

A further object of the invention is to provide means for adjusting the degree to which either cultivating device is forced into the ground relative to the other.

Another object of the invention is to provide an extension to the power take off of the tractor such that the second cultivating device may be powered.

Yet another object of the invention is to provide for the attachment of the second cultivating tool to the mounting device in such a way that the tool may float vertically relative to the mounting device within a limited range as the cultivating tools are drawn over the ground.

Yet another object of the invention is to provide for the use of an array of disks as the first cultivating tool with the disks set at a desirable angle to the direction of travel of the disks without the necessity of greatly separating the tool mounts provided for the first and second cultivating tools.

Other objects, features, and advantages of the invention will be apparent from the following detailed description taken in conjunction with the accompanying drawings showing a preferred embodiment of an auxiliary mounting device exemplifying the principles of the invention.

DETAILED DESCRIPTION OF THE PREFERRED EMBODIMENT

Figure 1:
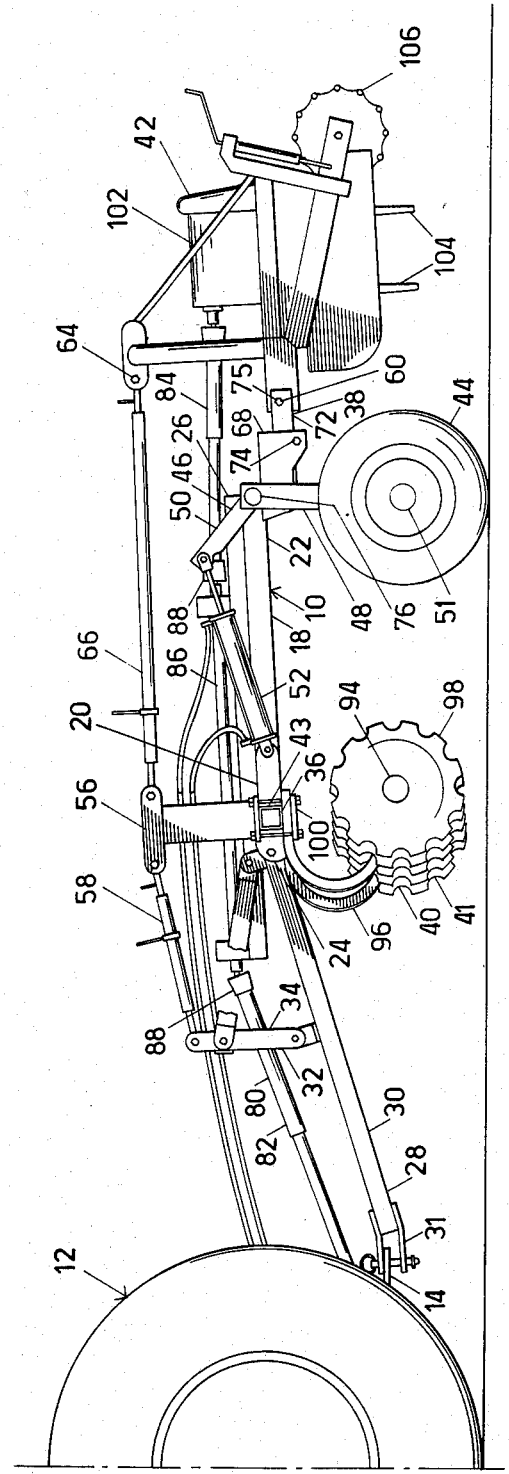
FIG. 1 is a side elevation view of the auxiliary mounting device of the invention bearing an array of disks as a first cultivating tool and a rotary harrow as a second cultivating tool, with the cultivating tools lifted above the ground and the auxiliary mounting device attached to a tractor, a portion of a brace member being broken away.
Figure 2:
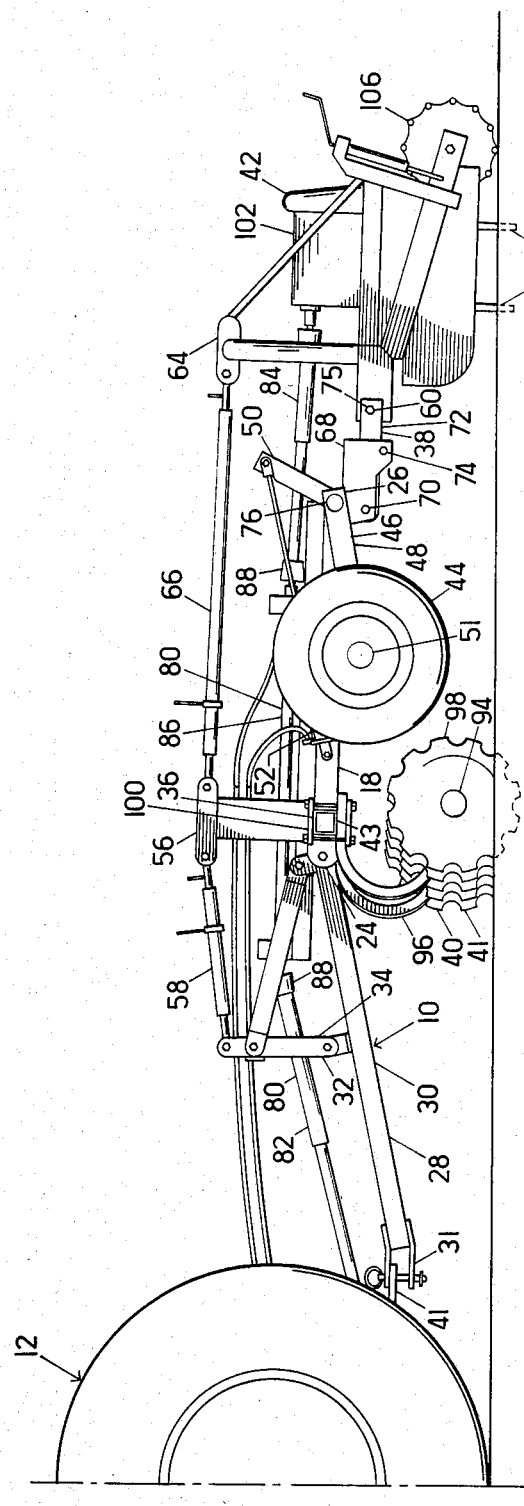
FIG. 2 is a side elevation view of the auxiliary mounting device of FIG. 1, with the cultivating tools engaged with the ground.
Figure 4:
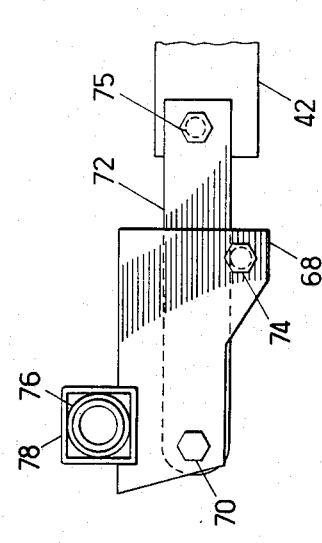
FIG. 4 is a side elevation view of the first attachment point of the secondary tool mount.
Figure 3:
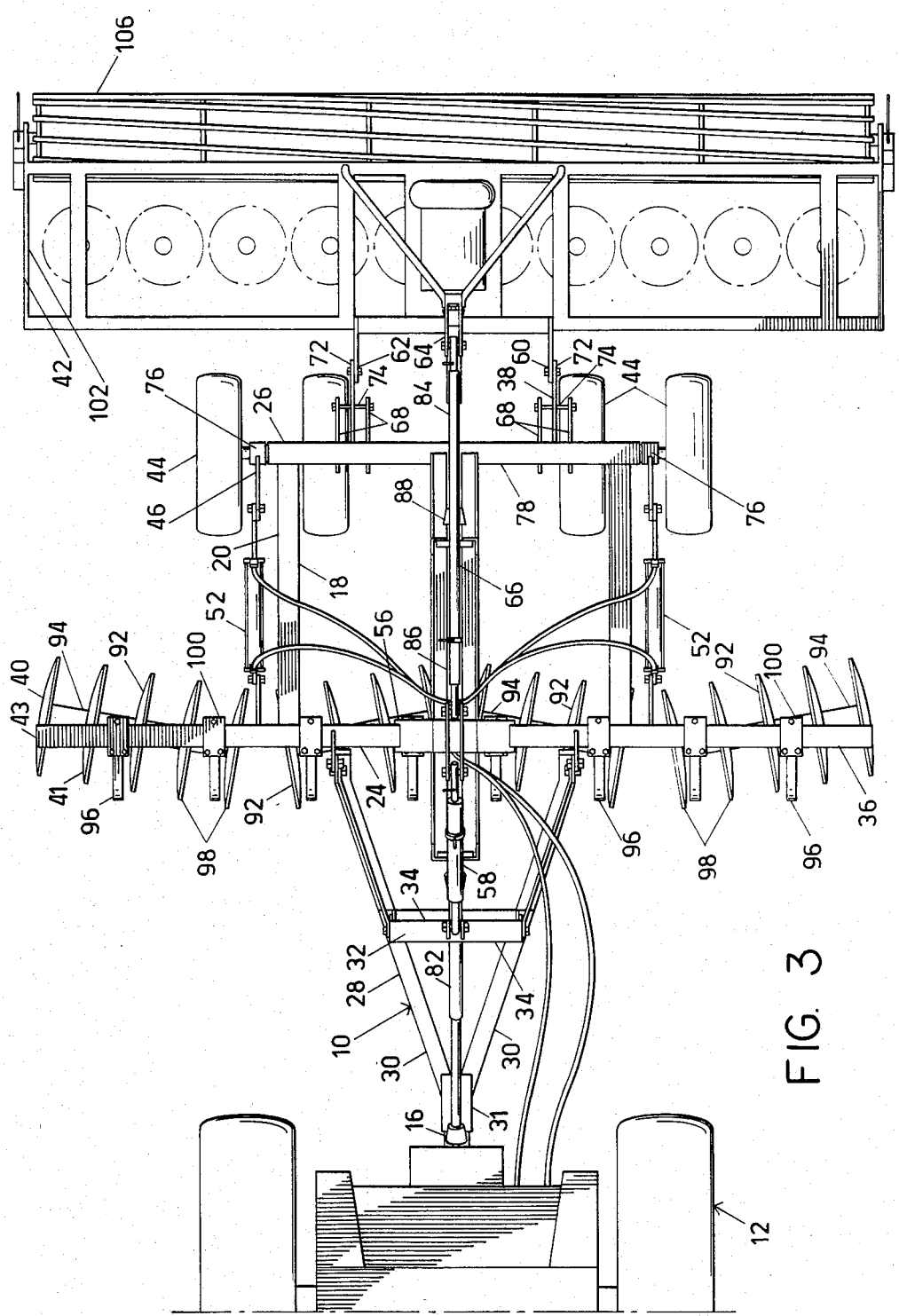
FIG. 3 is a top plan view of the auxiliary mounting device of FIG. 1, with the cultivating tools lifted above the ground.

Referring more particularly to the drawings, wherein like numbers refer to like parts, FIGS. 1, 2, and 3 illustrate a preferred embodiment of the novel auxiliary mounting device of the invention, shown generally at 10. The auxiliary mounting device 10 is adapted to be attached to a source of motive power such as the tractor shown schematically at 12. The tractor 12 has a conventional one-point drawbar tractor hitch 14 attached to the back of the tractor. In addition, the tractor has a conventional, rearwardly presented power take off 16. The power take off 16 is adapted to rotate about an axis generally parallel to the direction of motion of the tractor 12. Typically the power take off 16 is centrally located at the back of the tractor 12.

The auxiliary mounting device 10 has a body 18. The body 18 has an upper and an under side 20, 22 and a forward and a rearward end 24, 26. The longitudinal axis of the body 18 extends between the front and rearward ends 24, 26.

The auxiliary mounting device 10 includes means for attaching the body 18 to the one-point tractor drawbar hitch 14. Preferably the auxiliary mounting device 10 includes a tongue structure 28. The tongue structure 28 is generally symmetrical, having two tongue members 30 each attached to the body 18 at the forward end 24 at points remote from the longitudinal axis thereof. The tongue members 30 are attached to the body 18 in hinged relation thereto, being adapted to freely move about a horizontal axis transverse to the longitudinal axis of the body. The tongue members 30 converge to meet at a central point forward of the forward end 24 of the body 18. The tongue structure 28 further includes conventional means for attachment of the tongue structure to the tractor drawbar hitch 14. An example of such a hitch attachment device is the double plate and pin structure best shown at 31 in FIGS. 1 and 2. The attachment means is located at or forward of the point at which the converging tongue members 30 meet.

Preferably the tongue structure 28 includes a brace 32 rigidly attached to the tongue structure. The brace 32 includes two brace members 34, one attached rigidly to each tongue member 30. The brace members 34 extend upwardly from the tongue members 30 to converge at a point a selected distance thereabove.

The body 18 includes a primary tool mount 36 located generally at the forward end 24 of the body, and a secondary tool mount 38 located generally at the rearward end 26 of the body. The primary and secondary tool mounts 36, 38 are adapted respectively to support and carry a primary cultivation tool 40, such as the array of disks shown by way of example at 41, and a secondary cultivation tool 42, such as the rotary harrow shown by way of example. A variety of powered and unpowered cultivation tools, all well known in the art, could be substituted for the disks and rotary harrow shown, including by way of example spring tooth cultivators, chisel tooth or other plows, nonpowered harrows, and the like.

The primary tool mount 36 may be any structure strongly attached to the body 18 to which a selected cultivating tool may be mounted as the primary cultivating tool 40. In the preferred embodiment, the primary tool mount 36 includes a mounting bar 43 rigidly attached to the forward end 26 of the body 18 and extending laterally to either side of the body for a selected distance. Preferably the mounting bar 43 is made of a hollow, metal structural member having a rectangular cross sectional shape. The structure of the secondary tool mount 38 will be discussed in greater detail below.

The auxiliary mounting device 10 further includes wheels 44 having strength sufficient to bear the weight of both the body 18 and the primary and secondary cultivating tools 40, 42. Preferably, the auxiliary mounting device 10 includes at least four such wheels 44, grouped in symmetrically placed pairs, one located generally at each side of the body 18.

The wheels 44 are attached to the body 18 and are located at a selected point between the primary and secondary tool mounts 36, 38. Preferably the wheels 44 are each rotatably attached to a wheel mount 46 that is pivotably attached to the body 18 at a selected location referred to herein as the "point of attachment." The wheel mounts 46 all pivot about a common horizontal axis transverse to the longitudinal axis of the body 18. Each wheel mount 46 includes a weight-bearing arm 48 extending from the point of attachment for a selected distance, the wheels 44 being rotatably mounted thereon at a selected location remote from the point of attachment. The wheel mount 46 further includes a lever arm 50, which may be a separate structure, as is shown in the figures, and alternatively may be a portion of the weight-bearing arm 48, to which in any event it must be operatively connected. A wheel axle 51 is attached to the weight-bearing arm 48 and is adapted to hold at least one wheel 44 in rotating relation.

The auxiliary mounting device 10 further includes means for moving the wheels 44 between a first position (wherein the wheels support and elevate the body 18 and the primary and secondary cultivating tools 40, 42 are held above the ground), and a second position (wherein the body is lowered and the primary and secondary cultivating tools are engaged in the ground). Preferably the means for moving the wheels 44 includes at least one hydraulic ram 52 attached to the body 18 and to the lever arm 50 at a location thereon remote from the point of attachment of the wheel mount 46 to the body 18. When the hydraulic ram 52 is activated, the wheel mount 46 may be rotated about the point of attachment to a selected degree, carrying the wheels 44 either toward the ground to the first position or away from the ground to the second position. The wheel mount 46 and wheels 44 may likewise be held in any position intermediate the first and second positions. It will be obvious to one skilled in the art that alternative mechanical means could be used to move the wheels 44 between their first and second positions, the cooperating hydraulic ram 52 and wheel mount 46 being only an example and the preferred embodiment of means for so moving the wheels.

Preferably the primary tool mount 36, as is disclosed above, is located generally at the forward end 24 of the body 18, the secondary tool mount 38 is located generally at the rearward end 26 of the body 18, and the tractor attachment means is hinged to the forward end 24 of the body 18. Consequently, the body 18 and tractor attachment means may pivot relative to each other about a horizontal transverse axis, alternatively raising and lowering the forward end 24 of the body and the primary tool mount 36 attached thereto relative to the secondary tool mount 38. The auxiliary mounting device 10 further includes means to hold the body 18 and tractor attachment means at selected, fixed angles relative to each other. Preferably a pedestal 56 is rigidly attached to the forward end 24 of the body 18, extending upwardly therefrom. A first variable length shaft 58 is pivotably attached to the pedestal 56 at a point remote from the body 18 and is pivotably attached as well to the tractor attachment means. When the tractor attachment means includes the tongue structure 28, including the brace 32 disclosed above, the first variable length shaft 58 may be conveniently attached to the brace at or above the location that the brace members 34 meet above the tongue members 30. The first variable length shaft 58 may include a turn buckle device, such as that shown in the Figures, a hydraulic ram comparable to the rams shown at 52 in association with the wheels 44, or equivalent devices known in the art for strongly and adjustably setting the distance between two points. It will be apparent that, as the first variable length shaft 58 is lengthened and shortened, the forward end 24 of the body 18, together with the primary tool mount 36 and primary cultivating tool 40 associated therewith, will be raised and lowered relative to the hitch attachment device and the secondary tool mount 38. Taken together, the pedestal 56, brace 32, and first variable length shaft 58 constitute an example of means to hold the body 18 and tractor attachment means at selected, fixed angles relative to each other.

The secondary tool mount 38 preferably includes a three-point mount designed to engage implements equipped with attachment means compatible with conventional three-point hitches employed on tractors, as is discussed above. The secondary tool mount 38 has first and second attachment points 60, 62 adapted to carry the secondary cultivating tool 42 in hinged relation to the rearward end 26 of the body 18. A third attachment point 64 is located above the first and second attachment points 60, 62 and is adapted to be pivotably attached to the secondary cultivating tool 42. The third attachment point 64 is adapted to be moved to selected, fixed, forwardly and rearwardly located positions to raise and lower the secondary cultivating tool 42 relative to the rearward end 26 of the body 18 by causing the tool to pivot about the first and second attachment points 60, 62, the third attachment point then being adapted to hold the secondary cultivating tool in fixed relation to the body. Preferably a second variable length shaft 66 is pivotably attached to the pedestal 56 and extends rearwardly therefrom to define the third attachment point 64. By lengthening and shortening the second variable length shaft 66, the third attachment point 64 may be moved to selected, fixed, forwardly and rearwardly located positions. Preferably the second variable length shaft 66 is a turn buckle device, such as that shown in the Figures, but a hydraulic ram comparable to the hydraulic ram 52 associated with the wheels 44 may be substituted for the turn buckle device, as may any conventional and strong means for lengthening and shortening the distance between points.

Preferably the first and second attachment points 60, 62 each include two side support pieces 68. The two side support pieces 68 are rigidly attached to the body 18 and extend generally parallel to the longitudinal axis thereof. A pivot pin 70 extends transverse to the longitudinal axis and is engaged by each of the side support pieces 68. A floating attachment member 72 is adapted to pivot about the pivot pin 70 and to extend rearwardly of the body 18. A stop pin 74 extends between the side support pieces 68 to be supported thereby at a location underneath the floating attachment member 72. The stop pin 74 is adapted to limit the downward motion of the floating attachment member 72 and to support the weight thereof and the weight of the secondary cultivating tool 42. The first and second attachment points 60, 62 further include means to limit the upward motion of the floating attachment member 72 beyond a selected point. The floating attachment member 72 includes, at a point remote from the pivot pin 70 means to engage the secondary cultivating tool 42 in hinged relation, such as the hole 75 adapted to receive an attachment pin or comparable device incorporated in the secondary cultivating tool 42. Thus, the secondary tool mount 38 is adapted to allow the secondary cultivating tool 42 to float vertically within confined limits.

It will be apparent that it is advantageous for the wheels 44 to move in a coordinated way. The preferred embodiment of the auxiliary mounting device 10 of the invention therefore includes a coordinating axle 76. The coordinating axle 76 extends transversely through the body 18 in rotating relation. The weight-bearing arms 48 associated with the wheels 44 are rigidly attached to the coordinating axle 76, so that each weight-bearing arm moves in concert with the others. By this means, the movement of the wheels 44 between their first and second positions is coordinated. Preferably the coordinating axle 76 is contained in turning relation within an axle housing 78. The axle housing 78 is a strong structure and is rigidly attached to the body 18 at its rearward end 26. The side support pieces 68 are attached to the under side 22 of the body 18 immediately beneath the coordinating axle 76, the axle housing 78 serving as the means to limit the upward motion of the floating attachment member 72.

It is desirable that provision by made for powering the secondary cultivating tool 42 by means of an appropriate connection to the power take off 16 of the tractor 12. Consequently, the auxiliary mounting device 10 of the invention includes means for extending the power take off 16 across the body 18 to the secondary cultivating tool 42. Preferably the means for extending the power take off includes a power shaft 80 extending generally parallel to the longitudinal axis of the body 18. The power shaft 80 is adapted to rotate and to accommodate vertical and horizontal angular movement between the tractor 12 and the body 18 and the body and secondary cultivating tool 42. Preferably the power shaft includes a first extendable section 82 reaching from the power take off 16 to the forward end 24 of the body 18, and a second extendable section 84 extending from the rearward end 26 to the power fitting of the secondary cultivating tool 42. The extendable sections 82, 84 are adapted to freely lengthen and shorten as the distances they span become longer or shorter. A fixed section 86 of the power shaft 80 is mounted in turning relation to the upper side 20 of the body 18, extending between the first and second extendable sections 82, 84, being attached thereto by universal joints 88. By coaction of the fixed section 86, the extendable sections 82, 84, and the universal joints 88, the power shaft 80 is adapted to accommodate vertical and horizontal angular movement between the tractor and the body and the body and the secondary cultivating tool.

Commonly the power take off 16 is centrally located at the back of the tractor 12 above the tractor hitch 14. The brace members 34 of the brace 32 are adapted to meet at a point sufficiently above the tongue members 30 to allow the power shaft 80 to pass under and between the brace members without any need for the power shaft to deviate from a central location over the tongue structure 28.

As is disclosed above, the primary and secondary cultivating tools 40, 42 may be any of a variety of powered and unpowered cultivating tools. However, in the preferred embodiment, the primary cultivating tool 40 includes the array of cultivating disks shown at 41. The array 41 is subdivided into a plurality of gangs of disks 92. Each gang 92 includes a disk axle 94 and at least one and preferably two disk braces 96 adapted to rigidly and adjustably mount the disk axle to the primary tool mount 36 in an orientation generally transverse to the longitudinal axis of the body 18 and end to end with the disk axles of adjacent gangs 92. A selected number of disks 98 are rotatably mounted parallel to each other on the disk axle 94. Preferably the disk braces 96 are a resilient, spring-like members allowing a selected amount of vertical movement of the disks 98 as they pass over uneven ground.

In the preferred embodiment, in which the primary tool mount 36 includes the mounting bar 43, each disk brace 96 includes a clamp member 100 adapted to be tightly clamped to the mounting bar. The clamp member 100 has sufficient play when loosened to allow the gang of disks 92 to be set at a variety of selected angles to the body's longitudinal axis, to allow the disks 98 to cut into and turn the soil through which the disks are passing. The gangs 92 have a length selected to be such that, when the gangs are set at the greatest desired angle to the mounting bar 43, the forward to rearward space occupied by the gangs is sufficiently small that no part of the array 41 of cultivating disks interferes with the normal operation of the wheels 44 or the means for attaching the body 18 to the tractor hitch 14. By this means, a conveniently long array 41 of cultivating disks may be mounted on the mounting bar 43 and set at a selected angle thereto, while still occupying only a desirably small and limited portion of the length of the body 18.

It will be apparent that individual gangs 92 may be removed or added, to take the array 41 wider or narrower as may be desired. It will also be apparent that the ground engaging portions of spring tooth cultivators, chisel tooth plows, and the like may be mounted in individually removable gangs comparable to those disclosed above allowing for the same flexibility in adjustment of the width of the primary cultivating tool 40.

The wheels 44 may be lowered to a selected extent intermediate the first and second positions to support the body 18, thereby controlling the depth that the primary and secondary cultivating tools 40, 42 penetrate the ground. However, if the secondary cultivating tool 42 incorporates a roller or other device for controlling the depth into the ground to which the ground penetrating parts of the secondary cultivating tool may extend, the wheels 44 may be moved to their second position, with the body 18 and both the primary and secondary cultivating tools 40, 42 supported between the tractor hitch 14 and the secondary cultivating tool 42. An example of a secondary cultivating tool 42 so equipped is the powered rotary harrow sold by the Lely Corporation under the trademark LELY-ROTERA®, shown in the Figures at 102. The Lely-Rotera rotary harrow 102 has rotating, vertically oriented sets of tines 104 and utilizes a roller 106 that may be raised and lowered to control the depth that the tines 104 penetrate into the ground. The roller 106 extends transverse to the direction of motion of the Lely-Rotera rotary harrow 102, resting on the surface of the ground to support the rotary harrow.

With such an implement as the Lely-Rotera rotary harrow 102 utilized as the secondary cultivating tool 42, the orientation of the secondary cultivating tool relative to the ground may be controlled by adjusting the second variable length shaft 66. The depth into the ground in which the ground engaging parts of the secondary cultivating tool 42 penetrate may be controlled by the tool's own means for controlling that depth. The depth that the primary cultivating tool 40 penetrates the ground may then be controlled by adjustment of the first variable length shaft 58 in the manner disclosed above.

The auxiliary mounting device 10 of the invention may be made of metal structural members of conventional sorts fastened together with bolts, welds, and other conventional means of assembling the metal parts of farm implements. It is understood that the present invention is not limited to the particular construction and arrangement of parts illustrated and disclosed. Instead, it embraces all such modified forms thereof as come within the scope of the following claims.

What is claimed is:

1. An auxiliary mounting device for use with a tractor having a one-point hitch, the auxiliary mounting device comprising:
   (a) a body having a forward end and a rearward end with the longitudinal axis of the body extending therebetween;
   (b) tractor attachment means for attaching the body to the tractor hitch, the tractor attachment means being hinged to the forward end of the body to allow the tractor attachment means and the body to pivot relative to each other about a horizontal, transverse axis;
   (c) a primary tool mount on which a primary cultivating tool may be mounted in fixed relation to the body;
   (d) a secondary, three point mount located rearwardly of the primary tool mount and on which a secondary cultivating tool may be mounted, the three-point mount having a first and second attachment points adapted to carry the secondary cultivating tool in hinged relation to the rearward end of the body and a third attachment point located above the first and second attachment points, the third attachment point being adapted to be pivotably attached to the secondary cultivating tool;
   (e) a pedestal extending upwardly from the body and rigidly attached thereto with a first variable length shaft pivotably attached to the pedestal, the first variable length shaft also being pivotably attached to the tractor attachment means to hold the body and tractor attachment means at selected, fixed angles relative to each other, whereby the primary tool mount may be raised and lowered relative to the secondary tool mount, a second variable length shaft also being pivotably attached to the pedestal and extending rearwardly therefrom, terminating in the third attachment point, whereupon the third attachment point may be moved to selected, fixed, forwardly and rearwardly located positions by lengthening and shortening the second variable length shaft; and
   (f) wheels attached to the body in rotating relation, located at a selected point between the primary and secondary tool mounts, and having means for moving the wheels between a first position, wherein the wheels support and elevate the body and the primary and secondary cultivation tools are held above the ground, and a second position, wherein the primary and secondary cultivating tools are engaged in the ground and the wheels are withdrawn to a position entirely above and out of contact with the ground, wherein each of the first and second attachment points includes
   (g) two side support pieces rigidly attached to the body and extending generally parallel to the longitudinal axis thereof;
   (h) a pivot pin extending between and supported by each of the side support pieces;
   (i) a floating attachment member adapted to pivot about the pivot pin and to extend rearwardly of the body, the floating attachment member having at a point remote from the pivot pin means to engage the secondary cultivating tool in hinged relation;
   (j) a stop pin extending between and supported by the side support pieces at a location beneath the floating attachment member to limit the downward motion of the floating attachment member; and
   (k) means to restrain the upward motion of the floating attachment member, whereby the secondary tool mount is adapted to allow the secondary cultivating tool to float vertically within confined limits.

2. The auxiliary mounting device of claim 1 wherein the body has an upper side and an under side, a coordinating axle extends transversely through the body in rotating relation, the wheels include two pairs of wheels, 3. The auxiliary mounting device of claim 1 wherein the pivot pin is located at a point on the body rearward to and remote from the primary tool mount, whereby the primary tool mount may be elevated and depressed relative to the remaining parts of the auxiliary mounting device without substantial vertical elevation and depression of the pivot pin.

4. The auxiliary mounting device of claim 3 including a secondary cultivating tool having ground penetrating parts and a device for supporting the secondary cultivating tool above the ground to adjustably control the depth in the ground to which the ground penetrating parts may extend, whereupon the wheels may be moved to their second position to leave the body and both the primary and secondary cultivating tools supported between the tractor hitch and the secondary tool.

5. An auxiliary mounting device for use with a tractor having a one-point tractor hitch, the auxiliary mounting device comprising:
   (a) a body having a forward end and a rearward end with the longitudinal axis of the body extending therebetween;
   (b) tractor attachment means for attaching the body to the tractor hitch, the tractor attachment means being hinged to the forward end of the body to allow the tractor attachment means and the body to pivot relative to each other above a horizontal transverse axis;
   (c) a primary tool mount on which a primary cultivating tool may be mounted in fixed relation to the body, the primary tool mount being rigidly attached to the body at a generally forward location thereon;
   (d) a secondary, three-point tool mount located rearwardly of the primary tool mount and on which a secondary cultivating tool may be mounted, the three-point mount having first and second attachment points adapted to carry the secondary cultivating tool in hinged relation to the rearward end of the body and a third attachment point located above the first and second attachment points, the first and second attachment points each including a floating attachment member pivotably attached to the body at a point rearward to and remote from the primary tool mount; means to hold the body and tractor attachment means at selected, fixed angles relative to each other, whereby the primary tool mount may be raised and lowered relative to the secondary tool mount; and
   (e) wheels attached to the body in rotating relation, located at a selected point between the primary and secondary tool mounts, and having means for moving the wheels between a first position, wherein the wheels support and elevate the body and the primary and secondary cultivation tools are held above the ground, and a second position, wherein the primary and secondary cultivating tools are engaged in the ground and the wheels are withdrawn to a position entirely above and out of contact with the ground.

* * * * *

UNITED STATES PATENT AND TRADEMARK OFFICE
CERTIFICATE OF CORRECTION

PATENT NO. : 4,650,006
DATED : March 17, 1987
INVENTOR(S) : Harold J. Reimann

It is certified that error appears in the above-identified patent and that said Letters Patent are hereby corrected as shown below:

Col. 8, line 17, "take" should read "make".

Col. 9, line 19, the word "a" should be removed.

Col. 10, line 37, the word "a" should be placed between the words "in" and "fixed".

Claim 2 is missing the following after the word "wheels," in Col. 10, line 8:

"one pair located generally on each side of the body with the weight-bearing arms associated with the wheels each rigidly attached to the coordinating axle to provide for coordinated movement of the wheels between their first and second positions, and the side support pieces are attached to the under side of the body beneath the level of the coordinating axle."

Signed and Sealed this

First Day of March, 1988

*Attest:*

DONALD J. QUIGG

*Attesting Officer*　　　*Commissioner of Patents and Trademarks*